D. S. Curtiss,
Milk Pail Strainer.
No. 95,781.  Patented Oct. 12, 1869.
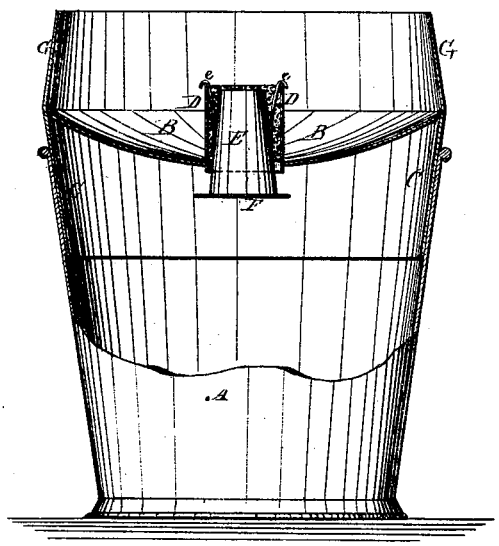
Witnesses.  Inventor.

United States Patent Office.

DANIEL S. CURTISS, OF WASHINGTON, DISTRICT OF COLUMBIA.

Letters Patent No. 95,781, dated October 12, 1869.

IMPROVEMENT IN MILK-PAILS AND STRAINERS.

The Schedule referred to in these Letters Patent and making part of the same.

*To all whom it may concern:*

Be it known that I, DANIEL S. CURTISS, of Washington, in the county of Washington, and in the District of Columbia, have invented certain new and useful Improvements in Milk-Pails and Strainers; and do hereby declare that the following is a full, clear, and exact description thereof, reference being had to the accompanying drawing, making a part of this specification, in which is shown a partial vertical central section of a milk-pail with my device attached.

Much milk is annually lost by the accidental overturning of pails while milking, and of such as is saved a large proportion of the cream is lost by straining the milk after the cream has commenced to rise.

To obviate these difficulties is the object of my invention, which consists principally in the employment of a concave cover, fitting closely to the top of the milk-pail, and having at its centre an opening for the passage of the milk, in which opening is placed a valve, shutting upward, so as to close the same when the pail is partially or wholly inverted.

It further consists in the peculiar construction of the valve, and in the employment thereon of two or more guide-springs, as is hereinafter described.

It further consists in the employment of a cylindrical diaphragm, secured to and projecting upward from the centre of said cover, for the purpose of straining the milk as it passes into the pail, and also for the purpose of furnishing a guide to and support for the valve.

It finally consists in the employment of a suitable flange or rim, projecting upward from the outer edge of the cover, and forming a reservoir for containing the milk as it is received from the cow, and before it passes downward into the pail.

In the annexed drawing—

A represents a pail of usual form, having secured within its top a cover, B, by means of a flange or rim, C, attached to and projecting downward and slightly inward from the edge of said cover, the downward taper of said rim being such as to correspond with the flare of the pail.

The upper side of the cover B is concave, and has at its centre an opening through which projects, upward, a cylinder, D, formed of reticulated sheet-metal, said cylinder corresponding in size with and being secured to the sides of said opening.

E represents a valve, consisting of a short cylinder, tapering upward from its lower end, which is of a suitable size to fill the opening with the cover.

Attached to opposite sides of the valve, near its centre vertically, are strips of sheet-metal, e, that from thence extend upward and outward, and are each bent over so as to form a hook which, when said valve is permitted to drop downward, as shown in the drawing, rests upon the upper edge of the diaphragm D, and supports it in place.

When the valve is raised, the outward spring of the strips serves to hold its upper end in place within the centre, radially of the diaphragm.

A circular disk, F, secured to and projecting outward from the lower end of the valve, completes the same, which operates as follows:

While the pail remains in a vertical position, the valve occupies the position shown in the drawing, and offers no obstruction to the free passage of the milk or other liquids through the diaphragm and the opening in the cover into the pail; but if said pail be inverted, the valve immediately shuts into said opening and effectually closes it against the egress of the contents of said pail.

Upon again placing the pail in a vertical position, the valve drops downward, and remains suspended as before.

When it is desired to remove the valve for the purpose of cleaning, the strips e are sprung inward until their hooked ends will enter the diaphragm, when the valve may be readily withdrawn.

A flange, G, secured to and extending upward and slightly inward from the outer edge of the cover B, prevents the spattering outward of the milk, and also forms a reservoir for containing said milk in the event of its entering the same more rapidly than it can pass through the diaphragm into the pail.

As thus constructed, this device possesses many advantages, among which are—

First, it prevents all waste of milk by the accidental overturning of the pail, the value of which in a single instance would more than equal the cost of the device.

Second, its use adds largely to the richness of the milk, which is strained as it enters the pail, and before the cream begins to rise, while, by the ordinary method, the straining is performed after the milking is over, by which means a large proportion of the cream adheres to and is removed with the dirt and froth remaining in the strainer.

Third, the device can be applied to any ordinary pail, is simple in construction, easily cleansed, and can be furnished at so small a cost as to bring it within the reach of all.

Having thus fully set forth the nature and merits of my invention,

What I claim as new, and desire to secure by Letters Patent, is—

The employment of a valve, opening inward upon or within the cover of a pail, substantially as and for the purpose specified.

Also, the employment of the diaphragm D, upon or within the cover B, substantially as shown and for the purpose specified.

Also, the valve E, constructed as described, and provided with the spring-guides and supports e, substantially as shown and for the purpose specified.

Also, the herein-described device, consisting of the cover B, provided with the rim C, and flange G, the diaphragm D, and the valve E, provided with the strips e, substantially as and for the purpose shown.

In testimony that I claim the foregoing, I have hereunto set my hand, this 21st day of September, 1869.

DANIEL S. CURTISS.

Witnesses:
GEO. S. PRINDLE,
A. E. LE MERLE.